UNITED STATES PATENT OFFICE.

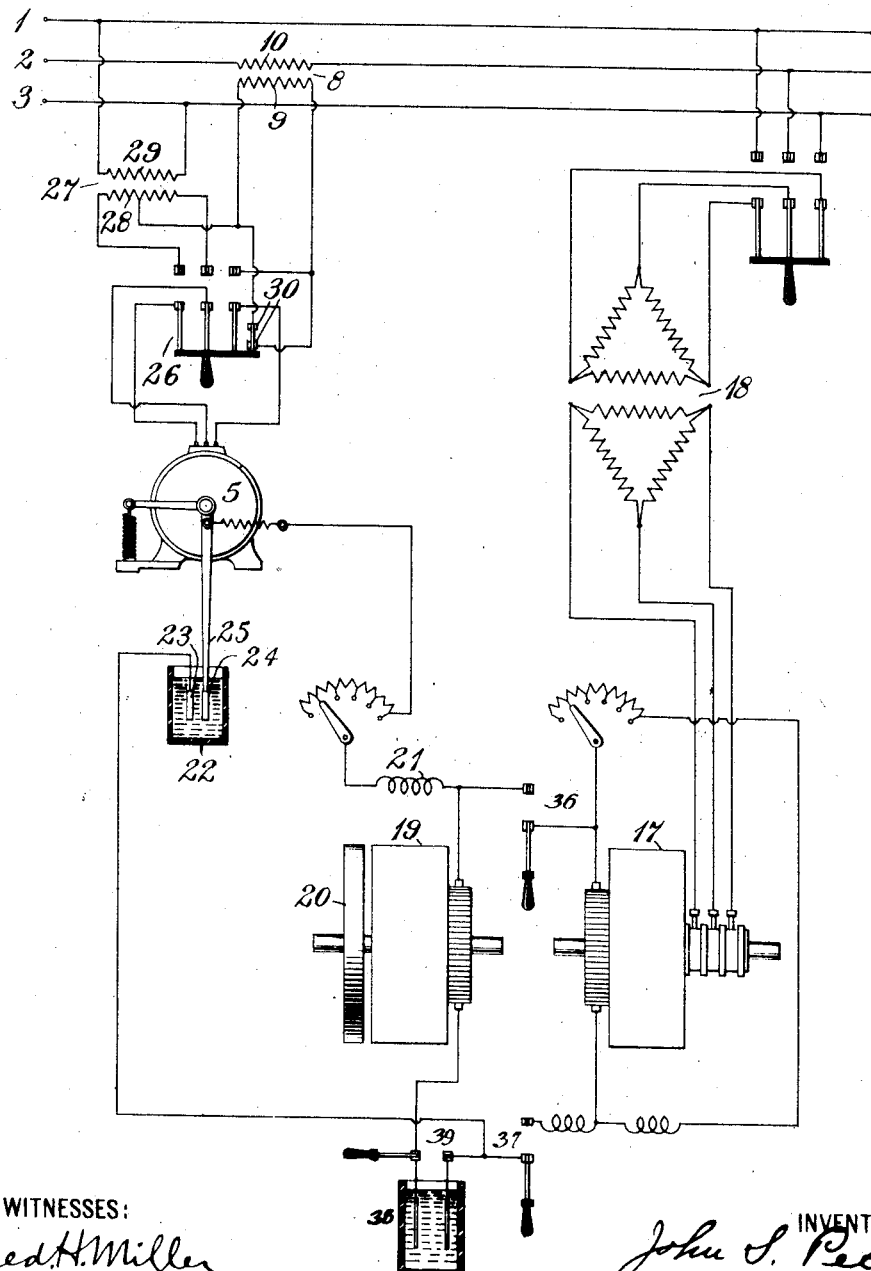

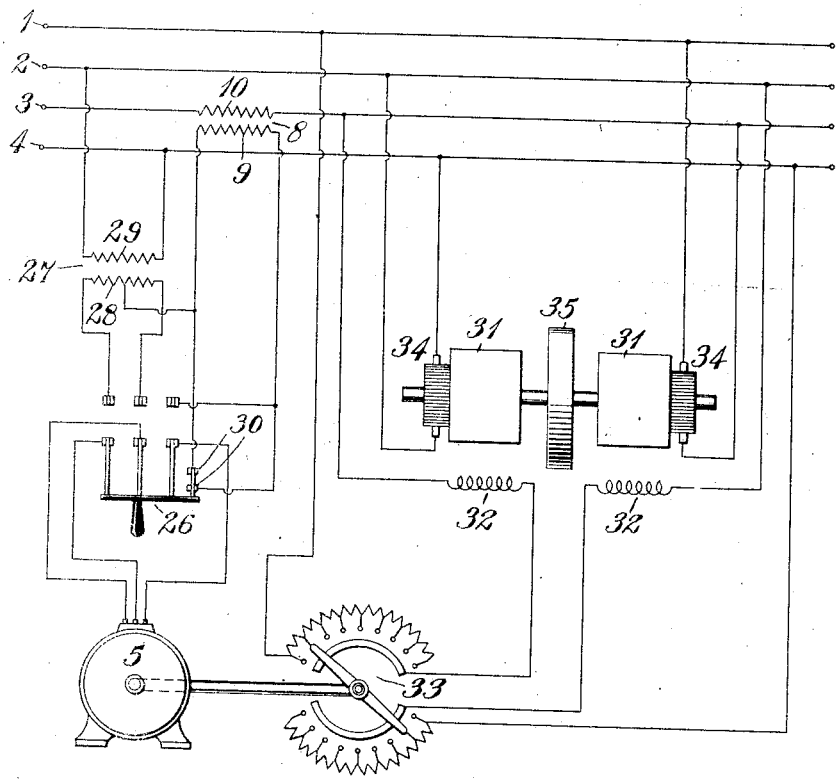

JOHN SEDGWICK PECK, OF MANCHESTER, ENGLAND, ASSIGNOR TO WESTINGHOUSE ELECTRIC AND MANUFACTURING COMPANY, A CORPORATION OF PENNSYLVANIA.

SYSTEM OF ELECTRICAL DISTRIBUTION.

1,108,931. Specification of Letters Patent. Patented Sept. 1, 1914.

Application filed October 2, 1909. Serial No. 520,752.

*To all whom it may concern:*

Be it known that I, JOHN SEDGWICK PECK, a citizen of the United States, and a resident of Trafford Park, Manchester, England, have invented a new and useful Improvement in Systems of Electrical Distribution, of which the following is a specification.

My invention relates to control apparatus for polyphase alternating current circuits provided with equalizer machines and it has for its object to provide an apparatus of this character, the operation of which shall be dependent upon the amount of energy which is being transmitted along the polyphase alternating current supply circuit at a certain point therein and also upon the direction of such transmission of energy at that point.

According to the present invention, the control apparatus comprises a regulating device and an operating motor having two or more windings so arranged that a reversal of the direction of the flow of current in one of the windings causes a reversal in the direction of rotative movement of the motor. One of the windings of the motor is supplied with current from a series transformer connected in one of the supply circuit conductors at the given point, the other winding or windings of the motor being supplied with current from a shunt transformer connected across two of the other supply circuit conductors which are so selected that, with non-inductive load, the electromotive force impressed upon the shunt transformer differs by substantially 90° in phase from the current traversing the series transformer.

The invention is particularly useful in connection with alternating current load equalizers of the kind in which a resistance or regulator controlled by a motor is provided for the purpose of varying the excitation of a dynamo-electric machine provided with a fly-wheel.

In systems of the above mentioned character the motor for controlling the resistance or regulator has heretofore been supplied with current from series transformers in the supply circuit, so that the torque of the motor varied in accordance with the amount of current transmitted along the supply circuit but was independent of the direction of such transmission. Under the conditions just stated, the excitation of the fly-wheel machine is the same whether the machine is supplying energy to the load or feeding current back to the power station. By the use of my present invention, a reversal of direction of transmission of energy would be impossible since such reversal would cause the motor to effect such increase in the resistance as to decrease the excitation of the fly-wheel machine, the operation of which would thus be restricted to its proper function of supplying energy to the load upon the supply circuit.

My invention is illustrated in the accompanying drawings of which—

Figures 1 and 2 are diagrammatic views illustrating the invention as applied to load-equalizing systems of known type.

Referring now to Fig. 1, the invention is illustrated as applied to a load-equalizing system which comprises a rotary converter 17 connected to three-phase supply circuit conductors 1, 2 and 3 through transformers 18; the direct current brushes of the converter 17 being connected to the brushes of a second dynamo-electric machine 19 by means of switches 36 and 37, through a rheostat 38, a switch 39 being provided for short circuiting the rheostat when desired. The machine 19 is provided with a fly-wheel 20 and has a shunt field winding 21 in the circuit of which a liquid regulating rheostat 22 is connected. The storage of energy in and discharge from the fly-wheel 20 of the dynamo-electric machine 19 is effected by varying the voltage of the said machine by means of the rheostat 22, which comprises a fixed plate 23 immersed in the resistance liquid, and a movable plate 24 connected to an arm 25 which is so attached to the shaft of a three-phase induction motor 5 that rotative movement of the motor in the one or the other direction will effect a variation of the resistance included in the circuit of the field magnet winding 21.

In order to vary the torque exerted by the motor 5 in accordance with the magnitude and direction of the energy transmitted along the supply circuit conductors 1, 2, 3, the terminals of the motor 5 are connected, through a switch 26, to series and shunt transformers 8 and 27, two of the motor terminals being connected to the terminals of the secondary winding 28 of the shunt transformer 27, the primary winding 29 of which is connected across the circuit conductors 1 and 3.

The middle point of the secondary winding 28 of the shunt transformer 27 is connected to one terminal of the secondary winding 9 of the series transformer 8, the primary winding 10 of which is connected in the circuit conductor 2. The other terminal of the winding 9 of the series transformer 8 is connected to the third terminal of the motor 5, the switch 26 being provided with special contacts 30 to short-circuit the secondary winding 9 of the series transformer 8 when the switch 26 is in its open position. The transformers 27 and 8 thus form a three-phase T connection, and the direction of rotation of the motor 5 will evidently depend upon the direction of flow of energy in the series transformer winding 10, since any reversal of the direction of such flow of energy will, by causing the motor 5 to move in the opposite direction, effect such an increase in the resistance included in the circuit of the field magnet winding 21 of the dynamo-electric machine 19, that the voltage of this machine will be so reduced as to prevent its operating to return energy to the power station.

In the normal operation of the system, alternating current derived from the work circuit 1—2—3 is changed to direct current by the rotary converter 17, and is supplied to the motor 19 which drives the fly-wheel 20 in which energy is thereby stored. If the load upon the work circuit becomes temporarily excessive, the voltage of the circuit will be correspondingly reduced, with the result that the rotary converter 17 delivers a reduced direct current electromotive force to the dynamo-electric machine 19 which becomes a generator by reason of the fact that the inertia of the fly-wheel tends to drive the machine at its original speed. At the same time, the regulating motor 5 moves the plate 24 closer to the plate 23, with the result that the field of the dynamo-electric machine 19 is increased. The direct current of the dynamo-electric machine 19, driven by the fly-wheel and operating as a generator, is transformed into alternating current by the rotary converter 17 and supplied to the work circuit for the purpose of assisting the main generator to supply the load and to maintain the voltage of the work circuit. As before explained, if the direction of current flow in the work circuit is reversed, the motor 5 will increase the resistance in the circuit of the field winding 21 and will, consequently, prevent the equalizing machine from supplying energy to the work circuit under such an abnormal condition.

Referring now to Fig. 2 of the drawings, the invention is illustrated as applied to a load-equalizing system in which the load-equalizer comprises two single-phase commutator motors 34 mounted on a common shaft which is provided with a fly-wheel 35. The armatures 31 and field magnet windings 32 of the motors 34 are connected to the supply circuit, as indicated in the drawing, and the excitation of the motors is varied by means of a double rheostat 33 which is connected in the circuits of their field magnet windings 32, the rheostat 33 being operated by means of an induction motor 5. The motor 5 is controlled by means of a switch 26, and the motor is supplied with energy from the supply circuit through shunt and series transformers 27 and 8, two of the motor terminals being connected to the terminals of the secondary winding 28 of the shunt transformer 27, the primary winding 29 of which is connected to the circuit conductors 2—4 of one phase, and the middle point of the winding 28 being connected to one terminal of the secondary winding 9 of the series transformer 8, the primary winding 10 of which is connected in the circuit conductor 3 of the other phase, in a similar manner to that already described with reference to Fig. 1, the other terminal of the winding 9 being connected to the remaining terminal of the motor.

The operation of the system is similar to that of the system shown in Fig. 1 and need not be further described. A suitably designed and connected single-phase commutator motor may be used instead of the motor 5 if desired.

It will be understood that the shunt and series transformers may be omitted if the voltage of the alternating current supply circuit is suitable for direct connection of the motor windings in series with and across the supply circuit conductors, respectively, in which case a two-phase winding on the motor is preferable.

While the methods of control described above are the ones which I prefer to use, numerous modifications may evidently be made within the scope of my invention.

I claim as my invention:

1. In a system of electrical distribution, the combination with an alternating current distributing circuit, and an equalizer machine associated therewith, of a regulating device for the equalizer machine, an actuating motor therefor that is connected to said circuit, and transformers interposed in the connections between the motor and the circuit having T-connected secondary windings, one of said transformers being connected in shunt to the distributing circuit and the other in series therewith.

2. An equalizer system for polyphase alternating current circuits having an equalizer machine and a regulating device which is so connected to the circuit that, upon a reversal of the direction of flow of current in the supply circuit, the said device operates to reduce the electro-motive force generated by the equalizer machine below that of the supply circuit.

3. In a system of electrical distribution, the combination with an alternating current circuit, an equalizing dynamo-electric machine having a fly-wheel, of a regulating rheostat for said machine, and an operating motor for said rheostat which is connected to the said circuit and the direction of rotative movement of which depends upon the direction of energy flow in said circuit.

4. The combination with an alternating current work circuit and an equalizing dynamo-electric machine therefor, of a regulating rheostat for said machine and an operating motor for said rheostat which has a shunt and a series connection to the work circuit and the direction of rotative movement of which depends upon the direction of energy flow in said work circuit.

5. In a system of electrical distribution, the combination with an alternating current distributing circuit, and an equalizer machine associated therewith, of a regulating device for the equalizer machine, an actuating motor therefor that is connected to said circuit, and transformers having connected secondary windings which are interposed in the connections between the motor and the circuit whereby currents differing approximately 90° in phase are supplied to the motor.

6. In a system of electrical distribution, the combination with an alternating current distributing circuit, and an equalizer machine associated therewith, of a regulating device for the equalizer machine, an actuating motor therefor, and transformers applying energy to the motor and so connected to the circuit that the motor is caused to reverse its direction of rotation when the direction of current flow in the distributing circuit reverses.

In testimony whereof, I have hereunto subscribed my name this sixteenth day of September, 1909.

JOHN SEDGWICK PECK.

Witnesses:
G. A. PINNER,
J. C. WHITMEYER.